United States Patent [19]
Hale

[11] 3,895,845
[45] July 22, 1975

[54] TRACK WITH ANTI-SIDE SLIP AND TRACTION BAR

[75] Inventor: Gordon B. Hale, Waukegan, Ill.

[73] Assignee: Outboard Marine Corporation, Waukegan, Ill.

[22] Filed: Dec. 28, 1970

[21] Appl. No.: 101,782

[52] U.S. Cl. .............................. 305/35 EB; 305/54
[51] Int. Cl. ............................................. B62d 55/24
[58] Field of Search .............. 305/35 EB, 37, 38, 54

[56] References Cited
UNITED STATES PATENTS

| | | | |
|---|---|---|---|
| 2,515,128 | 7/1950 | Lammertse | 305/38 |
| 3,550,968 | 12/1970 | Rymes | 305/35 EB |
| 3,558,198 | 1/1971 | Tomita | 305/35 EB |
| 3,572,851 | 3/1971 | Schuler | 305/35 EB |

FOREIGN PATENTS OR APPLICATIONS 154,501   5/1956   Sweden........................... 305/35 EB Primary Examiner—Philip Goodman
Assistant Examiner—John A. Carroll
Attorney, Agent, or Firm—Michael, Best & Friedrich

[57] ABSTRACT

Disclosed herein is a vehicle track including a plurality of traction bars secured to the outer surface of an endless belt in spaced apart parallel relation to one another transversely of the belt. Each of the traction bars includes a rigid member having an elongated flat base portion attached to the belt outer surface, a pair of ribs extending respectively from the opposed longitudinal edges of the base portion and projecting outwardly from the belt outer surface beyond the base portion, and a flange extending from one end of the base portion in generally upright relation to the base portion.

11 Claims, 2 Drawing Figures

Inventor
Gordon B. Hale
By
Attorney

TRACK WITH ANTI-SIDE SLIP AND TRACTION BAR

BACKGROUND OF THE INVENTION

Track vehicles such as snowmobiles and all-terrain vehicles sometimes exhibit a tendency toward side slippage, i.e., sliding movement occurring transversely to the direction of travel. Such side slippage can occur, for instance, when traveling along the side of a hill at a substantial angle to the direction of slope incline. Side slipping can also occur when such vehicles are stopped on a hill with the track located with its lengthwise direction at a substantial angle to the direction of slope incline.

Reference is hereby made to the Jespersen U.S. Pat. No. 3,776,325 and particularly to the track which is shown in FIGS. 12 and 18.

Reference is hereby also made to the Trapp application Ser. No. 33,162 which was filed on May 8, 1970 as a continuation of an earlier Trapp application Ser. No. 750,105, filed Aug. 5, 1968 and which has issued as U.S. Pat. No. 3,680,926.

SUMMARY OF THE INVENTION

The invention provides a vehicle track including a plurality of rigid bars which are attached to the outer surface of an elongated flexible belt and which include upstanding flanges projecting substantially beyond the outer surface of the belt and having a relatively large area when seen from the side of the belt so as to reduce or eliminate side slippage.

Also in accordance with the invention, the bars are provided with transversely extending traction ribs which project outwardly from the belt outer surface. In addition to providing protection against side slippage and improved traction, the disclosed traction bars also serve to unify several belt sections into an integrated belt and to define, together with the belt sections, holes or openings for receiving the teeth of a drive sprocket whereby power is transferred from the drive sprocket to the belt through the traction bars. In addition, the traction bars serve to rigidify the otherwise flexible belt in the transverse direction.

One of the principal objects of the invention is the provision of a track having superior traction and anti-side slipping capability.

Another of the principal objects of the invention is the provision of a track or belt having traction bars which extend transversely of the belt and include transversely extending traction ribs and end flanges extending in the direction of the length of the track.

Another of the principal objects of the invention is the provision of a track including a belt having attached thereto a plurality of bars each including upstanding flanges which extend perpendicular to the direction of the length of the belt and have a substantial surface when viewed from the side of the belt.

Another of the principal objects of the invention is the provision of a track constructed from a belt fabricated of flexible material such as rubber and tractions bars which are preferably fabricated from unitary rectangular pieces of metal, which are secured to the outer surface of the flexible belt, and which extend transversely of the belt to rigidify the belt transversely, while at the same time, providing improved traction and anti-side slip capability.

Another of the principal objects of the invention is the provision of a track including transversely extending metallic traction bars which are directly engaged by a drive sprocket to transmit power to the belt through the traction bars from the drive sprocket.

Another of the principal objects of the invention is the provision of an improved track which is economical to manufacture and which will provide reliable service over a long and useful life.

Other objects and advantages of the invention will become known by reference to the following description and accompanying drawings.

DRAWINGS

GENERAL DESCRIPTION

Figure 1:
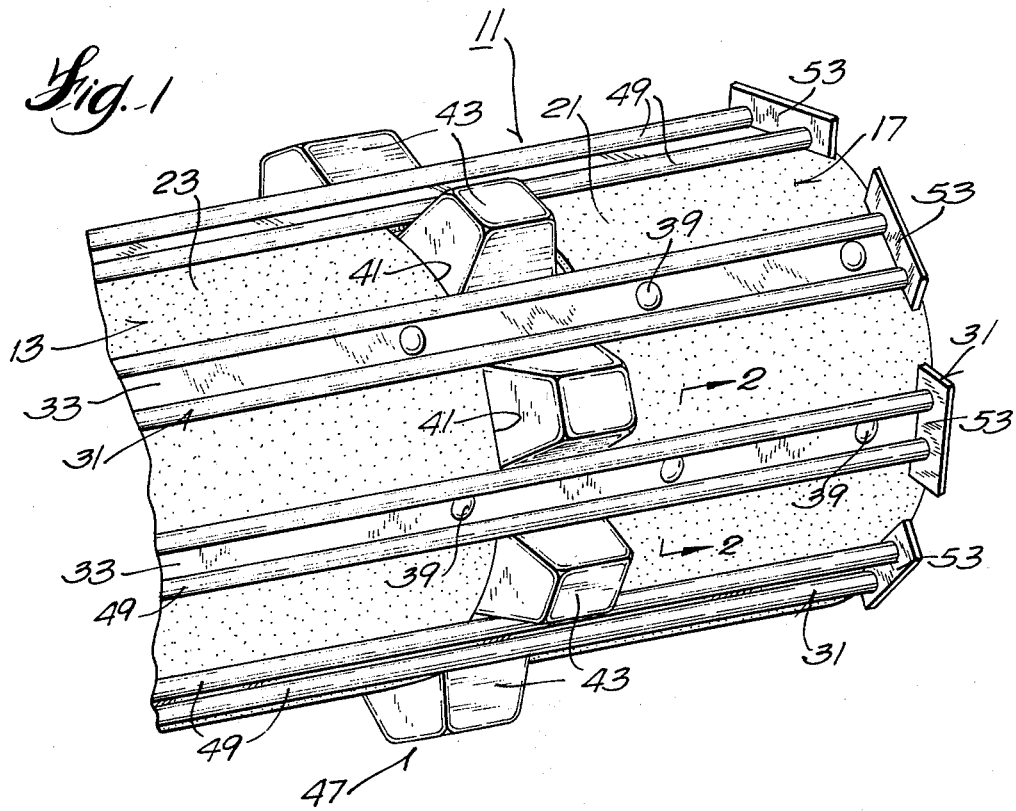
FIG. 1 is a fragmentary perspective view of a track embodying various of the features of the invention.

Shown in the drawings is a track 11 for a track vehicle, such as a snowmobile or an all-terrain vehicle. The track 11 comprises an elongated endless belt 13 which is fabricated or constructed of flexible non-metallic material, such as rubber or rubber-like plastic material, and which includes an outer surface 17 having longitudinally extending edges 19 (only one of which is shown). As shown, the belt 13 includes two sections 21 and 23 which are spaced apart transversely of the belt length. Belts having more than two transversely spaced sections, as well as belts which are not sectionally fabricated, are at least partially within the scope of the invention.

Also in accordance with the invention, the belt 13 is provided with means for providing superior traction in response to driving of the belt and for reducing or eliminating any tendency toward side slippage which might otherwise occur, as well as for unifying the belt sections 21 and 23 into an assembled belt. More specifically, the track 11 is provided with a plurality of rigid traction bars 31 which are secured to the belt outer surface 17 in transversely extending spaced apart parallel relation and which are constructed so as to afford traction and to prevent or reduce side slippage.

Figure 2:
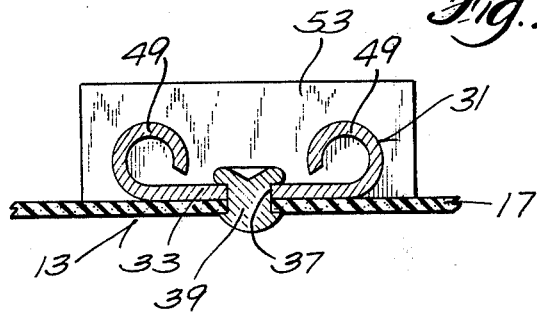
FIG. 2 is an enlarged fragmentary sectional view taken generally along line 2—2 of FIG. 1.

Still more specifically, each traction bar 31 includes an elongated base portion 33 which is provided with two or more apertures 37 (only one shown in FIG. 2) respectively receiving suitable fasteners 39, such as the illustrated rivets, which fasteners 39 connect the traction bar 31 to the belt 17. In the disclosed construction, each traction bar 31 is secured to each of the belt sections 21 and 23 so as to unify the sections 21 and 23 into the belt 13 and so as to define sprocket openings 41 into which the teeth 43 of a drive sprocket 47 projects so as to afford belt movement in response to sprocket rotation.

Each of the traction bars 31 also includes, along each transversely extending edge thereof, an upstanding rib 49 which projects upwardly from the belt outer surface 17 beyond the traction bar base portion 33 so as to afford superior traction. While various arrangements can be provided, in the disclosed construction, the ribs 49 are formed by forming edge portions of the traction bars 31 into a roll configuration. Accordingly, in the disclosed construction, the teeth 43 of the drive sprocket 47 engage one of the rolled ribs 49 of each engaged traction bar 31 to transfer driving power from the sprocket 47 to the belt 13. At least some of the advantages of the invention can be provided by employing only a single rib rather than the two ribs shown in the drawings.

Each traction bar 31 also includes, at each end, a flange 53 which extends generally upright at the adjacent side edge 19 of the belt outer surface 17 and which projects outwardly from the belt outer surface 17 and preferably in adjacent relation to the ends of the ribs 49 and outwardly relative to the belt outer surface 17 beyond the ribs 49 so as to reduce side slippage. (In the drawings, only one flange at one end of the traction bar is shown.) It is preferred to form each of the traction bars 31 from a unitary rectangular piece of metal and, accordingly, as the ribs 49 are rolled up from material extending from the side edges of the base portion 31, the flanges 53 extend oppositely, along the direction of the belt length, beyond the ribs 53, thereby cooperating with the projection of the flanges outwardly of the belt outer surface 17 to provide a relatively large side area. Further in this regard, the flanges 53 provide a relatively narrow frontal area (seen from in front) while at the same time providing a relatively large side area, whereby the relatively small or narrow frontal area does not materially adversely affect forward travel while the relatively large side area is effective to prevent or reduce side slippage.

While the described traction bars 31 include both traction providing ribs 49 and side slippage preventing flanges 53, at least some of the advantages of the invention can be obtained by employing bars which are attached to the outer surface of the belt and which include flanges for the prevention of side slippage, without the provision of the traction providing ribs.

While the disclosed construction contemplates traction bars 31 which are provided with flanges 53 at each end and which extend continuously between the outer edges 19 of the belt 13, at least some of the advantages of the invention can be obtained even if each traction bar does not extend completely across the width of the belt and even if the flanges are not located adjacent the side edges of the belt.

In addition to providing for the transmission of power to the belt 13 from the sprocket 47, and for increased traction and for reduction of side slippage, the described traction bars also serve to transversely rigidify the belt without adversely affecting lengthwise flexibility.

Various of the features of the invention are set forth in the following claims.

What is claimed is:

1. A track for a vehicle, said track comprising an elongated belt having an outer surface, and a plurality of bars secured to said outer surface in transverse relation to the length of the belt and in spaced apart parallel relation to one another, each bar comprising a rigid member including a base portion attached to said belt outer surface, a first rib extending from one of the opposed base portion edges extending transversely of said belt and projecting outwardly from said belt outer surface beyond said base portion, a second rib extending from the other of the opposed base portion edges extending transversely of said belt and projecting outwardly from said belt outer surface beyond said base portion, and a flange extending from one end of said base portion in generally upright relation to said base portion and projecting in the direction of the length of said belt, beyond said first and second ribs.

2. A track in accordance with claim 1 wherein said ribs extend in a roll configuration from the opposed edges or said bar base portion.

3. A track in accordance with claim 1 wherein said flange extends in generally adjacent relation to the adjacent ends of said ribs.

4. A track in accordance with claim 1 wherein each said flange projects outwardly from said belt outer surface beyond the projection of said ribs.

5. A track in accordance with claim 1 and wherein each said base portion is apertured and further including a plurality of fasteners cooperating with said apertures to attach said bars to said belt outer surface.

6. A track in accordance with claim 1 wherein said belt outer surface includes a longitudinally extending edge and wherein said flanges project from adjacent to said longitudinally extending edge.

7. A track in accordance with claim 1 wherein said bars are each constructed from a unitary piece of metal.

8. A track in accordance with claim 1 wherein said belt includes at least two transversely spaced sections and wherein said bars are connected to each of said sections, whereby to provide openings in said belt defined by said bars and the adjacent edges of said belt sections for receipt of the teeth of a drive sprocket.

9. A track for a vehicle, said track comprising an endless belt constructed of flexible non-metallic material and having an outer surface with longitudinally extending edges, said belt including at least two transversely spaced apart belt sections, and a plurality of traction bars located in spaced apart parallel relation to one another, and secured to said outer surface of each of said belt sections in transverse relation to said belt, whereby to provide openings in said belt defined by said traction bars and the adjacent edges of said belt sections for receipt of the teeth of a drive sprocket, each traction bar comprising a unitary metallic member including an elongated flat base portion attached to said belt outer surface, a pair of ribs extending respectively in a roll configuration from the opposed longitudinal edges of said base portion and projecting outwardly from said belt outer surface beyond said base portion, and at each end, a flange extending adjacent to one of said belt longitudinal edges and from and in generally upright relation to said base portion and in adjacent relation to the ends of said ribs and projecting outwardly from said belt outer surface beyond the projection of said ribs and projecting, in the direction of the length of the belt, beyond said ribs.

10. A track for a vehicle, said track comprising an endless belt having an outer surface with longitudinally extending edges, and a plurality of traction bars located in spaced apart parallel relation to one another, and secured to said outer surface of said belt in transverse relation to said belt, each traction bar comprising a unitary metallic member including an elongated flat base portion attached to said belt outer surface, a pair of ribs extending respectively in a roll configuration from the opposed longitudinal edges of said base portion and projecting outwardly from said belt outer surface beyond said base portion, and at one end, a flange extending adjacent to one of said belt longitudinal edges and from and in generally upright relation to said base portion and projecting, in the direction of the length of the belt, beyond said ribs.

11. A track for a vehicle, said track comprising an endless belt having an outer surface with longitudinally extending edges, and a plurality of traction bars located in spaced apart parallel relation to one another and secured to said outer surface of said belt in transverse relation to said belt, each traction bar comprising a unitary metallic member including an elongated flat base portion attached to said belt outer surface, a pair of ribs extending respectively in a roll configuration from the opposed longitudinal edges of said base portion and projecting outwardly from said belt outer surface beyond said base portion, and at one end, a flange extending adjacent to one of said belt longitudinal edges and from and in generally upright relation to said base portion and in adjacent relation to the ends of said ribs and projecting outwardly from said belt outer surface beyond the projection of said ribs and projecting, in the direction of the length of the belt, beyond said ribs.

* * * * *